United States Patent
Hsieh et al.

(10) Patent No.: US 12,198,291 B2
(45) Date of Patent: Jan. 14, 2025

(54) METHOD FOR ADJUSTING VIRTUAL OBJECT, HOST, AND COMPUTER READABLE STORAGE MEDIUM

(71) Applicant: HTC Corporation, Taoyuan (TW)

(72) Inventors: SyuanYu Hsieh, Taoyuan (TW); Sheng-Kun Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 188 days.

(21) Appl. No.: 17/736,096

(22) Filed: May 4, 2022

(65) Prior Publication Data
US 2023/0222625 A1 Jul. 13, 2023

Related U.S. Application Data

(60) Provisional application No. 63/298,628, filed on Jan. 12, 2022.

(51) Int. Cl.
*G06T 3/20* (2006.01)

(52) U.S. Cl.
CPC .................... *G06T 3/20* (2013.01)

(58) Field of Classification Search
CPC ... G06T 3/20; G06T 2219/2004; G06T 19/20; G06T 19/006; G06T 1/60; G06T 7/70; G06T 7/85; G06F 3/011; G06F 1/163
See application file for complete search history.

(56) References Cited

U.S. PATENT DOCUMENTS

| | | | |
|---|---|---|---|
| 2019/0220089 A1* | 7/2019 | Kakizawa | A63F 13/807 |
| 2019/0387168 A1* | 12/2019 | Smith | G06F 1/1686 |
| 2020/0258481 A1* | 8/2020 | Woo | G02B 27/017 |
| 2021/0019036 A1* | 1/2021 | Wang | G06F 3/0346 |
| 2021/0048680 A1* | 2/2021 | Deliz Centeno | G02B 27/0172 |
| 2022/0109822 A1* | 4/2022 | Winter | H04N 23/695 |
| 2022/0157029 A1* | 5/2022 | Horita | G06T 19/20 |
| 2022/0326028 A1* | 10/2022 | Savaresi | G01C 21/3602 |

FOREIGN PATENT DOCUMENTS

| | | | |
|---|---|---|---|
| CN | 107607295 | | 1/2018 |
| CN | 107607295 A | * | 1/2018 |
| CN | 113424142 | | 9/2021 |
| TW | 201839558 | | 11/2018 |

OTHER PUBLICATIONS

CN-107607295-A (Machine Translation on Jan. 11, 2024) (Year: 2018).*
"Office Action of Taiwan Counterpart Application", issued on Jan. 31, 2023, p. 1-p. 7.

* cited by examiner

*Primary Examiner* — Michael Le
(74) *Attorney, Agent, or Firm* — JCIPRNET

(57) ABSTRACT

The embodiments of the disclosure provide a method for adjusting a virtual object, a host, and a computer readable storage medium. The method includes: obtaining a first field of view (FOV) of a virtual world; obtaining a second FOV of a camera, wherein a first physical object locates within the second FOV of the camera; determining a FOV ratio based on the first FOV and the second FOV; determining a first position of a first virtual object in the virtual world relative to a reference object in the virtual world, wherein the first virtual object corresponds to the first physical object; determining a second position of the first virtual object in the virtual world based on the first position and the FOV ratio; and showing the first virtual object at the second position in the virtual world.

16 Claims, 8 Drawing Sheets

METHOD FOR ADJUSTING VIRTUAL OBJECT, HOST, AND COMPUTER READABLE STORAGE MEDIUM

CROSS-REFERENCE TO RELATED APPLICATION

This application claims the priority benefit of U.S. provisional application Ser. No. 63/298,628, filed on Jan. 12, 2022. The entirety of the above-mentioned patent application is hereby incorporated by reference herein and made a part of this specification.

BACKGROUND

1. Field of the Invention

The present disclosure generally relates to a content adjustment mechanism, in particular, to a method for adjusting a virtual object, a host, and a computer readable storage medium.

2. Description of Related Art

In the virtual world such as virtual reality (VR) world or augmented reality (AR) world, interacting with the real world is an important issue. The simplest way to achieve this purpose is through the camera (e.g., a tracking camera). Specifically, the camera can be disposed on a host (e.g., a head-mounted display (HMD)) and used to capture images of the to-be-tracked object. With these images, the host can perform image processing algorithms, calculate the position of the object and project the position of the object into the virtual world. In this way, the user can be able to interact with this object in the virtual world. However, the field of view (FOV) of the virtual world and the FOV of the camera are usually inconsistent, which may cause some issues.

See FIG. 1A and FIG. 1B, wherein FIG. 1A and FIG. 1B show schematic diagrams of the inconsistent FOVs of the virtual world and the camera. In FIG. 1A and FIG. 1B, the shown scenarios are respectively a top view and a front view of the considered FOVs 101 and 102. In this scenario, the FOV 101 can be the FOV of the virtual world, and the FOV 102 can be the FOV of the camera. In this case, the user (represented by the user representative object 199) can only see the visual contents within the FOV 101 but unable to see the visual contents outside of the FOV 101.

Similarly, the camera can only capture the images of the objects (e.g., the object 103) within the FOV 102. From another perspective, for some objects (e.g., the object 104) locating on some areas outside of the FOV 102, the host is unable to track these objects due to the limitation of the FOV 102, and these areas are commonly known as dead zones.

Conventionally, the objects in the dead zone are tracked based on the motion data provided by some auxiliary devices (e.g., the Inertial measurement unit (IMU)) disposed therein.

However, these auxiliary devices are not widely equipped on to-be-tracked objects, such that those objects without the auxiliary devices will suddenly disappear from the visual content seen by the user when moving from the FOV 102 to the dead zones. For example, since the object 103 is in the FOV 102, the object 103 can be tracked by the camera, and hence the object 103 can be projected to the FOV 101. In this case, the user can see the virtual object corresponding to the object 103 in the virtual world.

However, when the object 103 moves to the position where the object 104 locates, the object 103 cannot be tracked by the camera for being outside of the FOV 102, and hence the object 103 cannot be projected to the FOV 101. In this case, the user would see the object 103 suddenly disappearing from the FOV 101, which may degrade the visual experience of the user.

SUMMARY OF THE INVENTION

Accordingly, the disclosure is directed to a method for adjusting a virtual object, a host, and a computer readable storage medium, which may be used to solve the above technical problems.

The embodiments of the disclosure provide a method for adjusting a virtual object, adapted to a host. The method includes: obtaining a first field of view (FOV) of a virtual world; obtaining a second FOV of a camera, wherein a first physical object locates within the second FOV of the camera; determining a FOV ratio based on the first FOV and the second FOV; determining a first position of a first virtual object in the virtual world relative to a reference object in the virtual world, wherein the first virtual object corresponds to the first physical object; determining a second position of the first virtual object in the virtual world based on the first position and the FOV ratio; and showing the first virtual object at the second position in the virtual world.

The embodiments of the disclosure provide a host including a storage circuit and a processor. The storage circuit stores a program code. The processor is coupled to the non-transitory storage circuit and accesses the program code to perform: obtaining a first field of view (FOV) of a virtual world; obtaining a second FOV of a camera, wherein a first physical object locates within the second FOV of the camera; determining a FOV ratio based on the first FOV and the second FOV; determining a first position of a first virtual object in the virtual world relative to a reference object in the virtual world, wherein the first virtual object corresponds to the first physical object; determining a second position of the first virtual object in the virtual world based on the first position and the FOV ratio; and showing the first virtual object at the second position in the virtual world.

The embodiments of the disclosure provide a computer readable medium, the computer readable storage medium recording an executable computer program, the executable computer program being loaded by a host to perform steps of: obtaining a first field of view (FOV) of a virtual world; obtaining a second FOV of a camera, wherein a first physical object locates within the second FOV of the camera; determining a FOV ratio based on the first FOV and the second FOV; determining a first position of a first virtual object in the virtual world relative to a reference object in the virtual world, wherein the first virtual object corresponds to the first physical object; determining a second position of the first virtual object in the virtual world based on the first position and the FOV ratio; and showing the first virtual object at the second position in the virtual world.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1A:
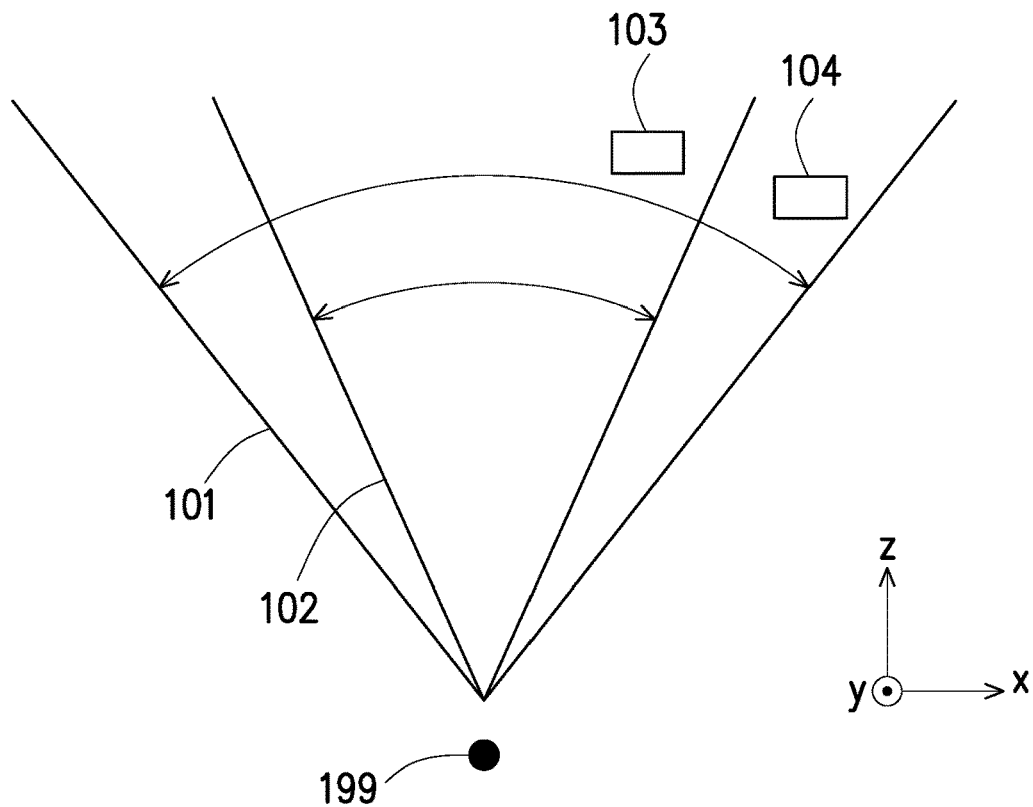
FIG. 1A and FIG. 1B show schematic diagrams of the inconsistent FOVs of the virtual world and the camera.

Reference will now be made in detail to the present preferred embodiments of the invention, examples of which are illustrated in the accompanying drawings. Wherever possible, the same reference numbers are used in the drawings and the description to refer to the same or like parts.

Figure 2:
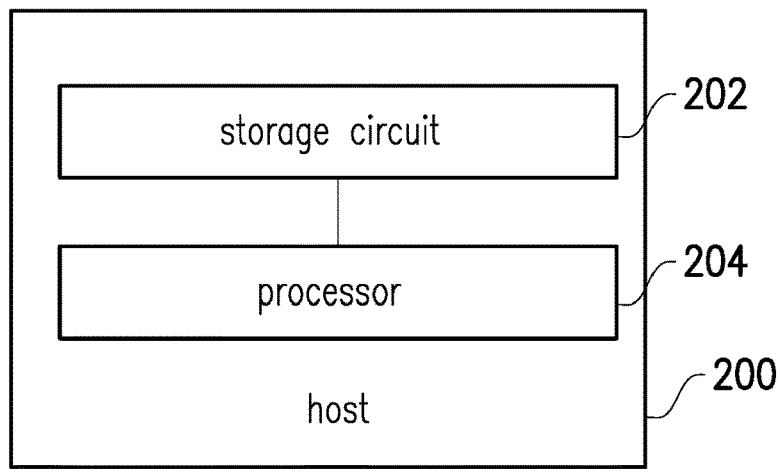
FIG. 2 shows a schematic diagram of a host according to an embodiment of the disclosure.

See FIG. 2, which shows a schematic diagram of a host according to an embodiment of the disclosure. In various embodiments, the host 200 can be implemented as any smart devices and/or computer devices.

The storage circuit 202 is one or a combination of a stationary or mobile random access memory (RAM), read-only memory (ROM), flash memory, hard disk, or any other similar device, and which records a plurality of modules that can be executed by the processor 204.

The processor 204 may be coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In one embodiment, the host 200 can be implemented as a tracking device that is capable of performing, for example, inside-out tracking and/or outside-in tracking. In one embodiment, the tracking device can be a wearable device such as a head-mounted display (HMD). In some embodiments, the HMD can be used to provide reality services (e.g., an AR service, a VR service, and/or the like) by displaying the corresponding visual contents to the wearer, but the disclosure is not limited thereto.

In one embodiment, the host 200 can be disposed with one or more (tracking) camera for capturing images used to perform tracking functions, such as the inside-out tracking.

In the embodiments of the disclosure, the processor 204 may access the modules stored in the storage circuit 202 to implement the method for adjusting a virtual object provided in the disclosure, which would be further discussed in the following.

Figure 3:
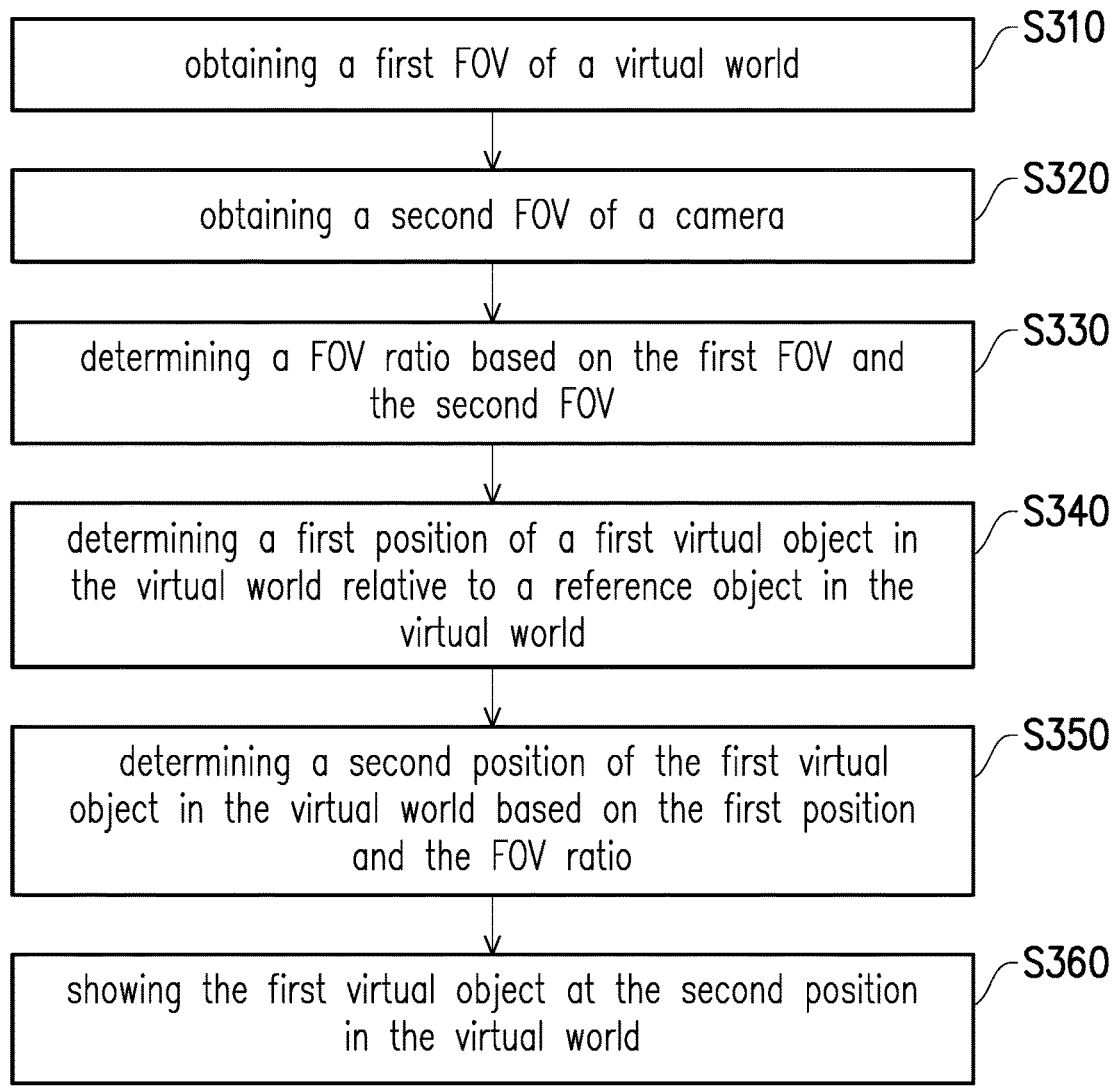
FIG. 3 shows a flow chart of the method for adjusting a virtual object according to an embodiment of the disclosure.
Figure 4A:
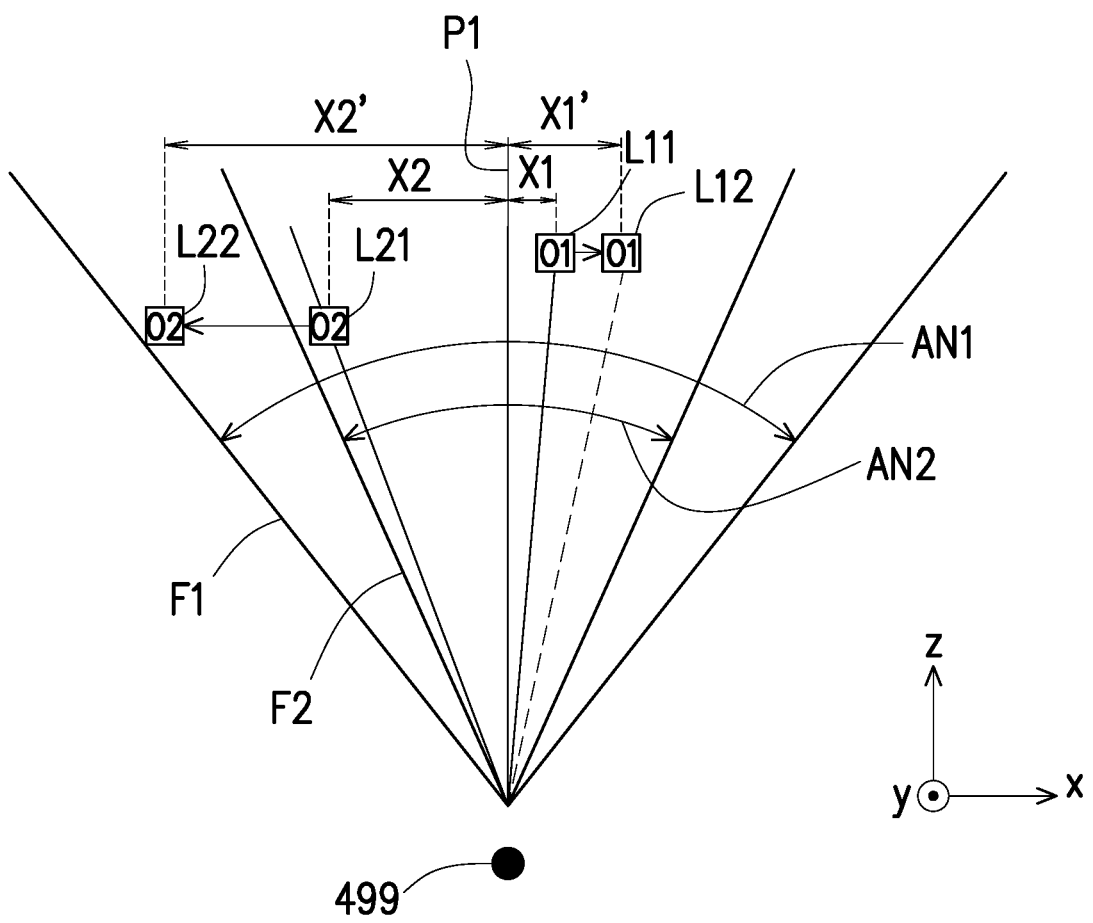
FIG. 4A shows a top view of the FOVs of the virtual world and the camera according to an embodiment of the disclosure.
Figure 4B:
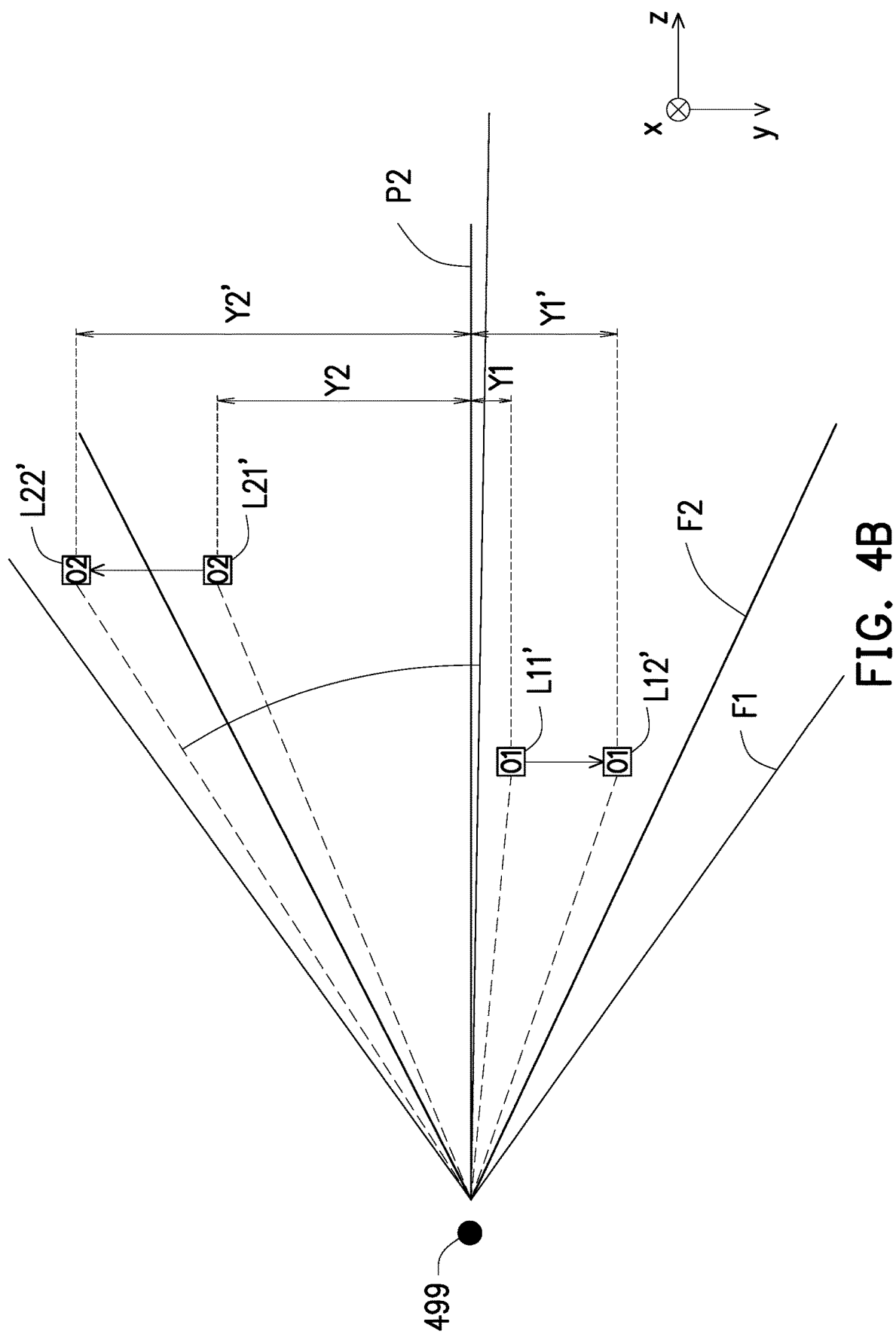
FIG. 4B shows a side view of the FOVs of the virtual world and the camera in FIG. 4A.

See FIG. 3, which shows a flow chart of the method for adjusting a virtual object according to an embodiment of the disclosure. The method of this embodiment may be executed by the host 200 in FIG. 2, and the details of each step in FIG. 3 will be described below with the components shown in FIG. 2. In addition, for better explaining the concept of the disclosure, FIG. 4A and FIG. 4B would be used as an example, wherein FIG. 4A shows a top view of the FOVs of the virtual world and the camera according to an embodiment of the disclosure, and FIG. 4B shows a side view of the FOVs of the virtual world and the camera in FIG. 4A.

In step S310, the processor 204 obtains a first FOV F1 of a virtual world. In the embodiment, the virtual world can be the VR environment provided by the host 200 as the VR service to the user of the host 200, but the disclosure is not limited thereto. In FIG. 4A and FIG. 4B, the user (represented by the user representative object 499) can only see the visual contents within the first FOV F1 but unable to see the visual contents outside of the first FOV F1.

In step S320, the processor 204 obtains a second FOV F2 of a camera. In one embodiment, the camera can be the tracking camera disposed on the host 200 for capturing images of one or more to-be-tracked physical objects within the second FOV F2.

In some embodiments, the processor 204 can simply read the system parameters/settings corresponding to the virtual world and the camera to obtain the first FOV F1 and the second FOV F2, but the disclosure is not limited thereto.

In the embodiments of the disclosure, the first FOV F1 and the second FOV F2 are characterized by a first viewing angle AN1 and a second viewing angle AN2. In FIG. 4A and FIG. 4B, the first viewing angle AN1 can be larger than the second viewing angle AN2. However, in some other embodiments, the first viewing angle AN1 can be smaller than the second viewing angle AN2.

In step S330, the processor 204 determines a FOV ratio based on the first FOV F1 and the second FOV F2. In one embodiment, the processor 204 can obtain the FOV ratio via dividing the first viewing angle AN1 by the second viewing angle AN2, i.e., the processor 204 obtains the FOV ratio by calculating AN1/AN2.

In another embodiment, the first FOV F1 can include a sub-FOV having a size between the first FOV F1 and the second FOV F2, and the sub-FOV can be characterized by a third viewing angle (referred to as AN3). In this case, the processor 204 can obtain the FOV ratio via dividing the third viewing angle AN3 by the second viewing angle AN2, i.e., the processor 204 obtains the FOV ratio by calculating AN3/AN2, but the disclosure is not limited thereto.

In the scenario of FIG. 4A and FIG. 4B, the FOV ratio can be a value larger than 1 since the first FOV F1 (and the sub-FOV) is larger than the second FOV F2. However, in other embodiments where the first FOV F1 is smaller than the second FOV F2, the FOV ratio can be a value between 0 and 1.

In step S340, the processor 204 determines a first position of a first virtual object in the virtual world relative to a reference object in the virtual world, wherein the first virtual object corresponds to one of the physical objects within the second FOV F2. Taking FIG. 4A and FIG. 4B as an example, after the processor 204 has tracked a physical object within the second FOV F2, the processor 204 can determine the to-be-projected positions L11 and L11' of the corresponding virtual object O1 in the virtual world. For another example, after the processor 204 has tracked another physical object within the second FOV F2, the processor 204 can determine the to-be-projected positions L21 and L21' of the corresponding virtual object O2 in the virtual world.

In one embodiment, the considered reference object can include at least one reference plane in the virtual world. In this case, the processor 204 can obtaining a distance between the first virtual object and each of the at least one reference plane as the first position of the first virtual object in the virtual world relative to the reference object in the virtual world.

In FIG. 4A, the considered reference object can be a Y-Z plane P1. In this case, the processor 204 can obtain an X component of a coordinate of the first virtual object in the virtual world as the distance between the first virtual object and the Y-Z plane P1.

For example, the processor 204 can obtain the X component of the coordinate of the virtual object O1 in the virtual world as the distance X1 between the virtual object O1 and the Y-Z plane P1. In this case, the distance X1 can be the first position of virtual object O1 in the virtual world relative to the reference object in the virtual world.

For another example, the processor 204 can obtain the X component of the coordinate of the virtual object O2 in the virtual world as the distance X2 between the virtual object O2 and the Y-Z plane P1. In this case, the distance X2 can be the first position of virtual object O2 in the virtual world relative to the reference object in the virtual world.

In FIG. 4B, the reference object can be an X-Z plane P2. In this case, the processor 204 can obtain a Y component of the coordinate of the first virtual object in the virtual world as the distance between the first virtual object and the X-Z plane P2.

For example, the processor 204 can obtain the Y component of the coordinate of the virtual object O1 in the virtual world as the distance Y1 between the virtual object O1 and the X-Z plane P2. In this case, the distance Y1 can be the first position of virtual object O1 in the virtual world relative to the reference object in the virtual world.

For another example, the processor 204 can obtain the Y component of the coordinate of the virtual object O2 in the virtual world as the distance Y2 between the virtual object O2 and the X-Z plane P2. In this case, the distance Y2 can be the first position of virtual object O2 in the virtual world relative to the reference object in the virtual world.

In other embodiments, the reference object can be an X-Y plane. In this case, the processor 204 can obtain a Z component of the coordinate of the first virtual object in the virtual world as the distance between the first virtual object and the X-Y plane.

For example, the processor 204 can obtain the Z component of the coordinate of the virtual object O1 in the virtual world as the distance between the virtual object O1 and the X-Y plane. For another example, the processor 204 can obtain the Z component of the coordinate of the virtual object O2 in the virtual world as the distance between the virtual object O2 and the X-Y plane.

In step S350, the processor 204 determines a second position of the first virtual object in the virtual world based on the first position and the FOV ratio. In one embodiment, the processor 204 obtains the second position via multiplying the FOV ratio by the distance between the first virtual object and each of the at least one reference plane.

For example, in FIG. 4A, the processor 204 can multiply the FOV ratio by the distance X1 between the virtual object O1 and the Y-Z plane P1 to obtain a distance X1' for characterizing the second position of the virtual object O1. In the embodiment, the second position of the virtual object O1 can represented by the to-be-shown position L12.

Similarly, the processor 204 can multiply the FOV ratio by the distance X2 between the virtual object O2 and the Y-Z plane P1 to obtain a distance X2' for characterizing the second position of the virtual object O2. In the embodiment, the second position of the virtual object O2 can be represented by the to-be-shown position L22.

For another example, in FIG. 4B, the processor 204 can multiply the FOV ratio by the distance Y1 between the virtual object O1 and the X-Z plane P2 to obtain a distance Y1' for characterizing the second position of the virtual object O1. In the embodiment, the second position of the virtual object O1 can represented by the to-be-shown position L12'.

Similarly, the processor 204 can multiply the FOV ratio by the distance Y2 between the virtual object O2 and the X-Z plane P2 to obtain a distance Y2' for characterizing the second position of the virtual object O2. In the embodiment, the second position of the virtual object O2 can be represented by the to-be-shown position L22'.

In step S360, the processor 204 shows the first virtual object at the second position in the virtual world.

In FIG. 4A, the processor 204 shows the virtual objects O1 and O2 at the corresponding second positions. Specifically, the processor 204 shows the virtual object O1 at the to-be-shown position L12 and shows the virtual object O2 at the to-be-shown position L22. That is, instead of showing the virtual objects O1 and O2 at the corresponding to-be-projected positions L11 and L21, the processor 204 shows the virtual objects O1 and O2 at the positions (i.e., the to-be-shown positions L12 and L22) outward than the to-be-projected positions L11 and L21 based on the FOV ratio.

Figure 1B:
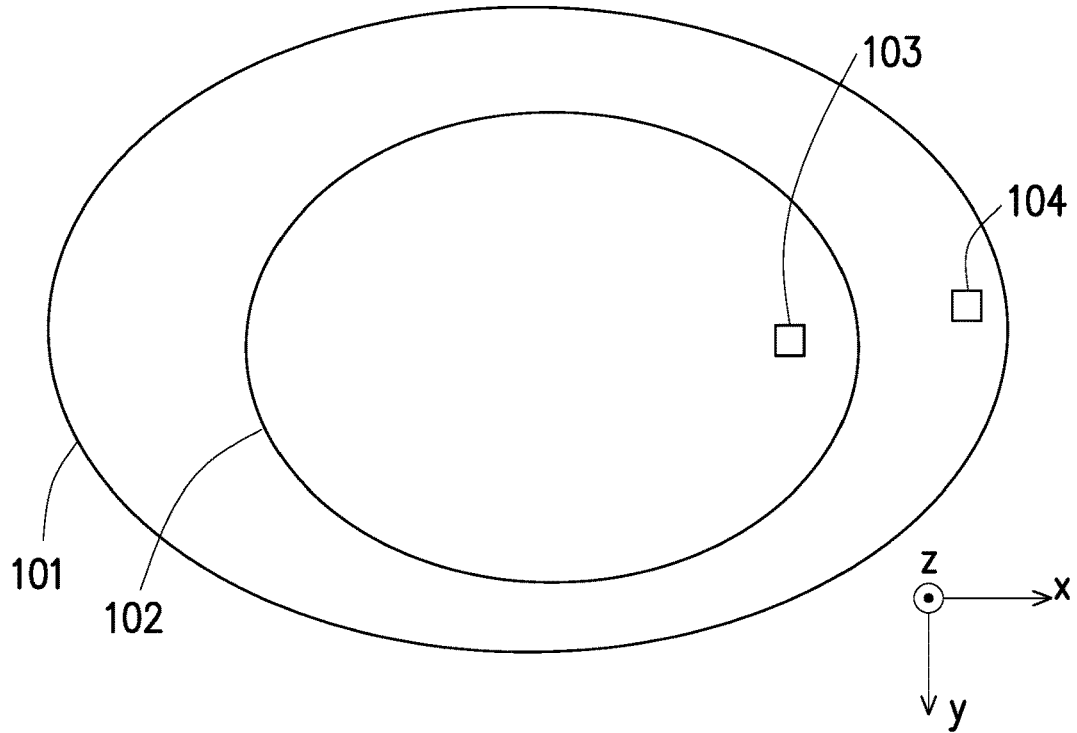

In this case, when the physical object corresponding to the virtual object O1 move to be near the boundary of the second FOV F2, the virtual object O1 would be accordingly moved to be near the boundary of the first FOV F1. In addition, when the physical object corresponding to the virtual object O1 reaches the boundary of the second FOV F2 and leaves the second FOV F2, the virtual object O1 would also reach the boundary of the first FOV F1 and naturally leaves the first FOV1, rather than suddenly disappear somewhere in the first FOV F1 as shown in FIG. 1A and FIG. 1B. Same principle applies for the virtual object O2.

Accordingly, the visual experience of the user can be prevented from being affected by the suddenly disappeared virtual objects even if the corresponding physical objects are in the dead zone of the camera.

In FIG. 4B, the processor 204 shows the virtual object O1 at the to-be-shown position L12' and shows the virtual object O2 at the to-be-shown position L22'. That is, instead of showing the virtual objects O1 and O2 at the corresponding to-be-projected positions L11' and L21', the processor 204 shows the virtual objects O1 and O2 at the positions (i.e., the to-be-shown positions L12' and L22') outward than the to-be-projected positions L11' and L21' based on the FOV ratio.

Accordingly, the visual experience of the user can be guaranteed based on the reasons in the above.

In one embodiment, the results in FIG. 4A and FIG. 4B can be combined to collectively determine the shown positions of the virtual objects O1 and O2. For example, after obtaining the distances X1' in FIG. 4A and Y1' in FIG. 4B, the processor 204 can show the virtual object O1 at position whose X component and Y component are the distances X1' and Y1', respectively. For another example, after obtaining the distances X2' in FIG. 4A and Y2' in FIG. 4B, the processor 204 can show the virtual object O2 at position whose X component and Y component are the distances X2' and Y2', respectively. Accordingly, the visual experience of the user can be guaranteed based on the reasons in the above.

In one embodiment, after obtaining the second position of the first virtual object, the processor 204 can further correct a depth of the second position of the first virtual object. Taking the virtual object O1 as an example, if the second position thereof is determined to be a specific position whose X component and Y component are the distances X1' and Y1', respectively, the distance between this specific position and the user representative object 499 would be longer than the distance between the to-be-projected position L11 and the user representative object 499. That is, if the virtual object O1 is directly shown at the specific position, the distance between this specific position and the user representative object 499 would be slightly distorted.

Therefore, the processor 204 can correct the depth of this specific position based on the distance between the to-be-projected position L11 and the user representative object 499, such that the distance between the user representative object 499 and the corrected specific position (i.e., the corrected second position) can be less distorted. In one embodiment, after correcting the depth of the specific position, the distance between the corrected specific position and the user representative object 499 can be substantially the same as the distance between the to-be-projected position L11 and the user representative object 499, but the disclosure is not limited thereto.

From another perspective, the concept of the disclosure can be understood as creating a mapping relationship between the first FOV F1 and the second FOV F2.

Figure 5A:
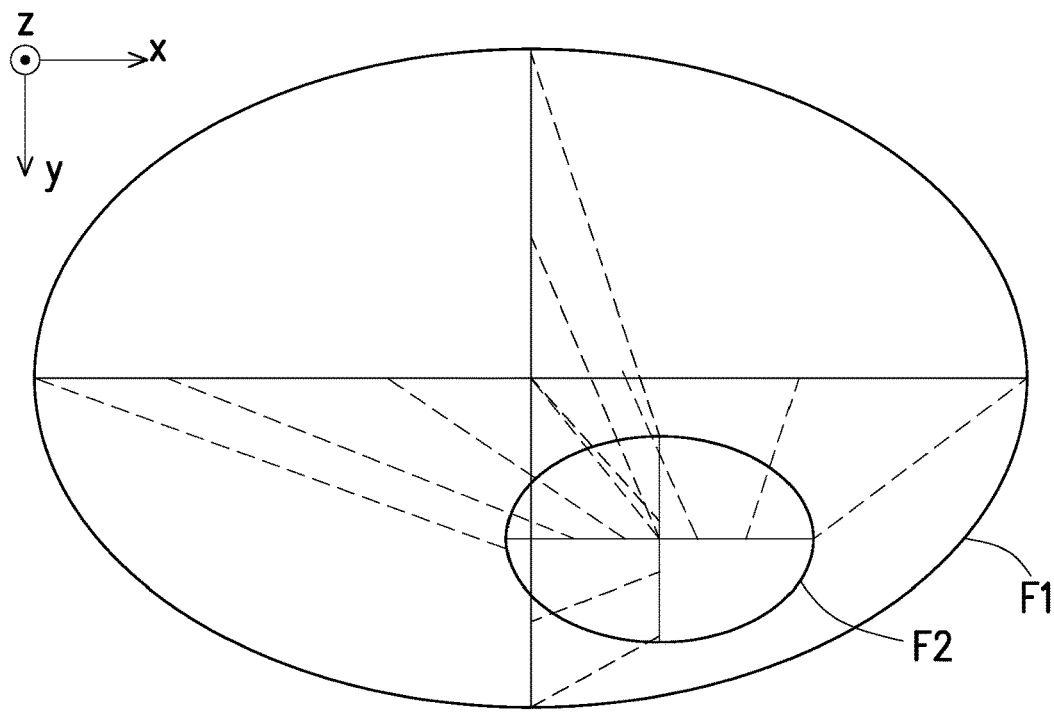
FIG. 5A shows a front view of the first FOV and the second FOV according to an embodiment of the disclosure.
Figure 5B:
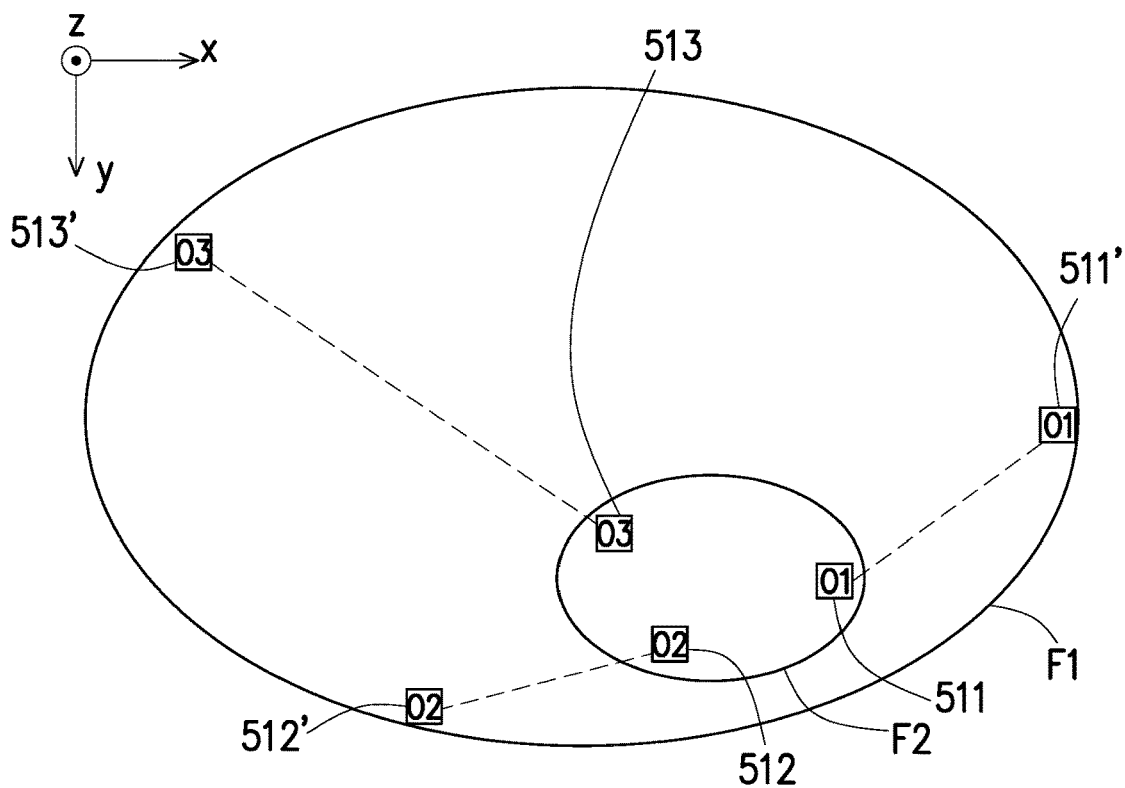
FIG. 5B shows the mapping between the first FOV and the second FOV of FIG. 5A.

See FIG. 5A and FIG. 5B, wherein FIG. 5A shows a front view of the first FOV and the second FOV according to an embodiment of the disclosure, and FIG. 5B shows the mapping between the first FOV and the second FOV of FIG. 5A. In FIG. 5A and FIG. 5B, all the positions in the second FOV F2 can be mapped to the corresponding positions in the first FOV F1, such as the positions connected by dotted lines.

Therefore, for the virtual objects O1-O3, instead of showing the virtual objects O1-O3 at the corresponding to-be-projected positions 511-513, the processor 204 would show the virtual objects O1-O3 at the corresponding second positions 511'-513', i.e., the mapped positions of the to-be-projected positions 511-513 in the first FOV F1. Therefore, when the virtual objects O1-O3 reaches the boundary of the second FOV F2 and leaves the second FOV F2, the user would see the virtual objects reaches the boundary of the first FOV F1 and leaves the first FOV F1. Accordingly, the visual experience of the user can be prevented from being affected by the suddenly disappeared virtual objects even if the corresponding physical objects are in the dead zone of the camera.

In one embodiment, the considered reference object can be the user representative object 499. In this case, when the processor 204 determines the first position of the first virtual object in the virtual world relative to the reference object in the virtual world, the processor 204 can obtain a multi-axis angle of the first virtual object relative to the user representative object 499 as the first position of the first virtual object in the virtual world relative to the reference object.

Figure 6A:
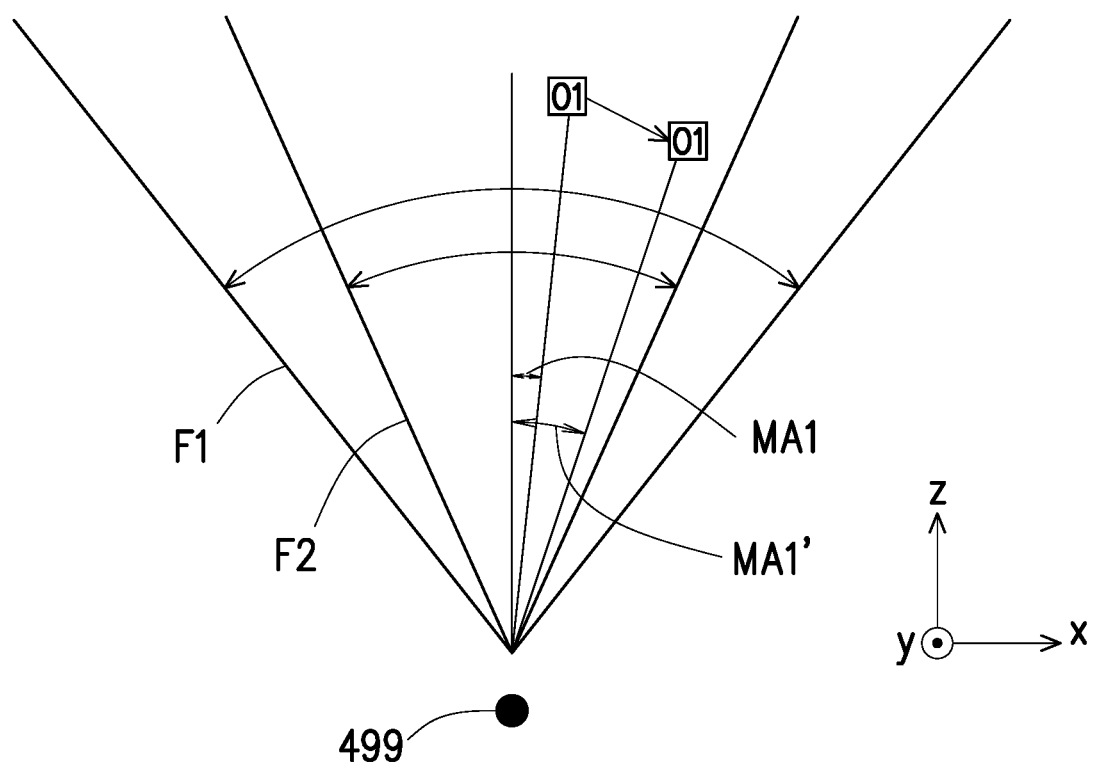
FIG. 6A shows a top view of the FOVs of the virtual world and the camera according to FIG. 4A.
Figure 6B:
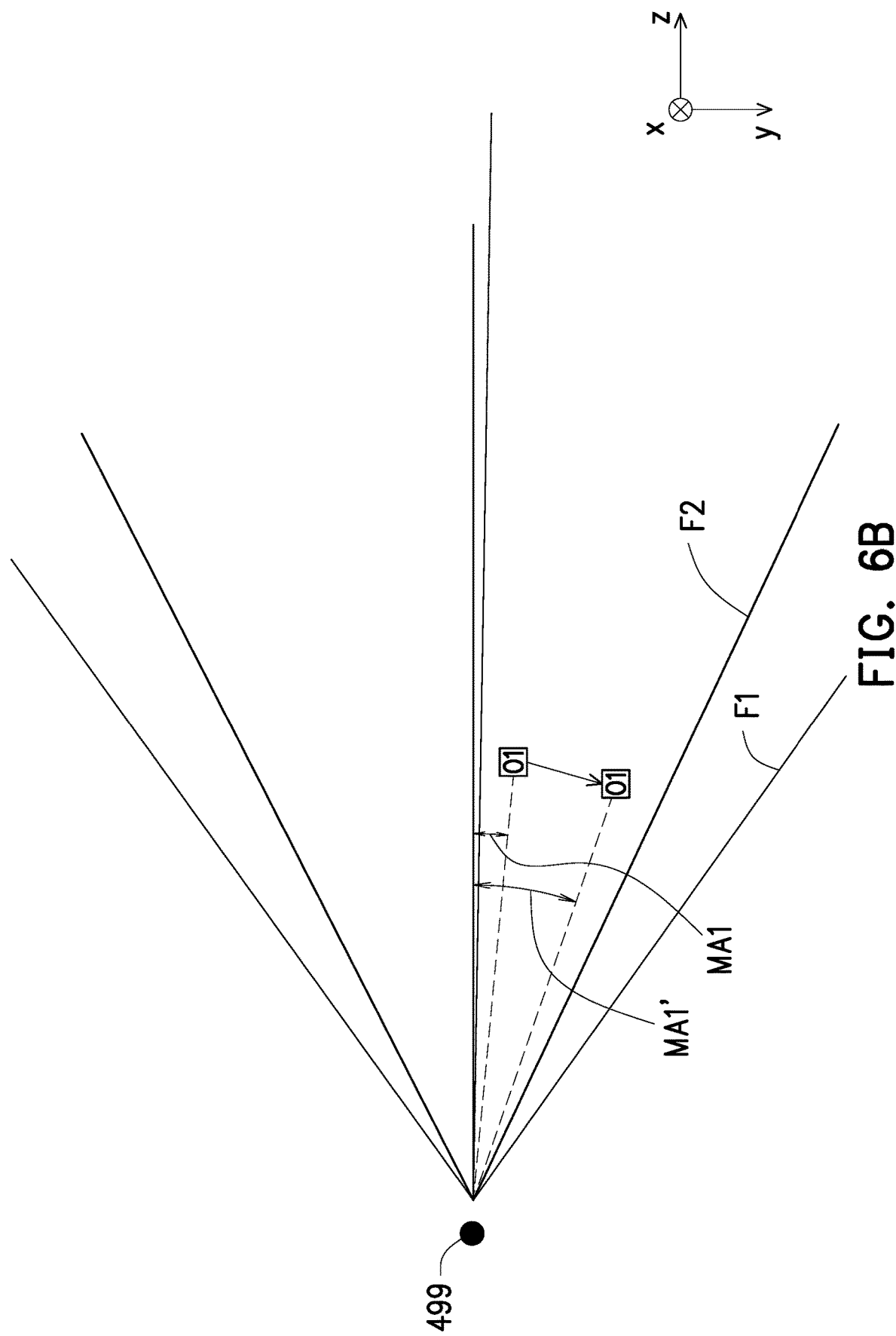
FIG. 6B shows a side view of the FOVs of the virtual world and the camera in FIG. 6A.

See FIG. 6A and FIG. 6B, wherein FIG. 6A shows a top view of the FOVs of the virtual world and the camera according to FIG. 4A, and FIG. 6B shows a side view of the FOVs of the virtual world and the camera in FIG. 6A.

In FIG. 6A and FIG. 6B, the processor 204 can obtain the multi-axis angle MA1 of the virtual object O1 relative to the user representative object 499 as the first position of the virtual object O1 in the virtual world relative to the user representative object 499 (i.e., the reference object).

In one embodiment, the processor 204 obtains the second position via multiplying the FOV ratio by the multi-axis angle MA1. In FIG. 6A and FIG. 6B, assuming that the multi-axis angle MA1' is the result of multiplying the FOV ratio by the multi-axis angle MA1. In this case, the processor 204 can show the virtual object O1 at the position corresponding to the multi-axis angle MA1'. That is, instead of showing the virtual object O1 at the corresponding to-be-projected position, the processor 204 shows the virtual object O1 at the position outward than the to-be-projected positions based on the FOV ratio.

In this case, when the physical object corresponding to the virtual object O1 move to be near the boundary of the second FOV F2, the virtual object O1 would be accordingly moved to be near the boundary of the first FOV F1. In addition, when the physical object corresponding to the virtual object O1 reaches the boundary of the second FOV F2 and leaves the second FOV F2, the virtual object O1 would also reach the boundary of the first FOV F1 and naturally leaves the first FOV1, rather than suddenly disappear somewhere in the first FOV F1.

Figure 7:
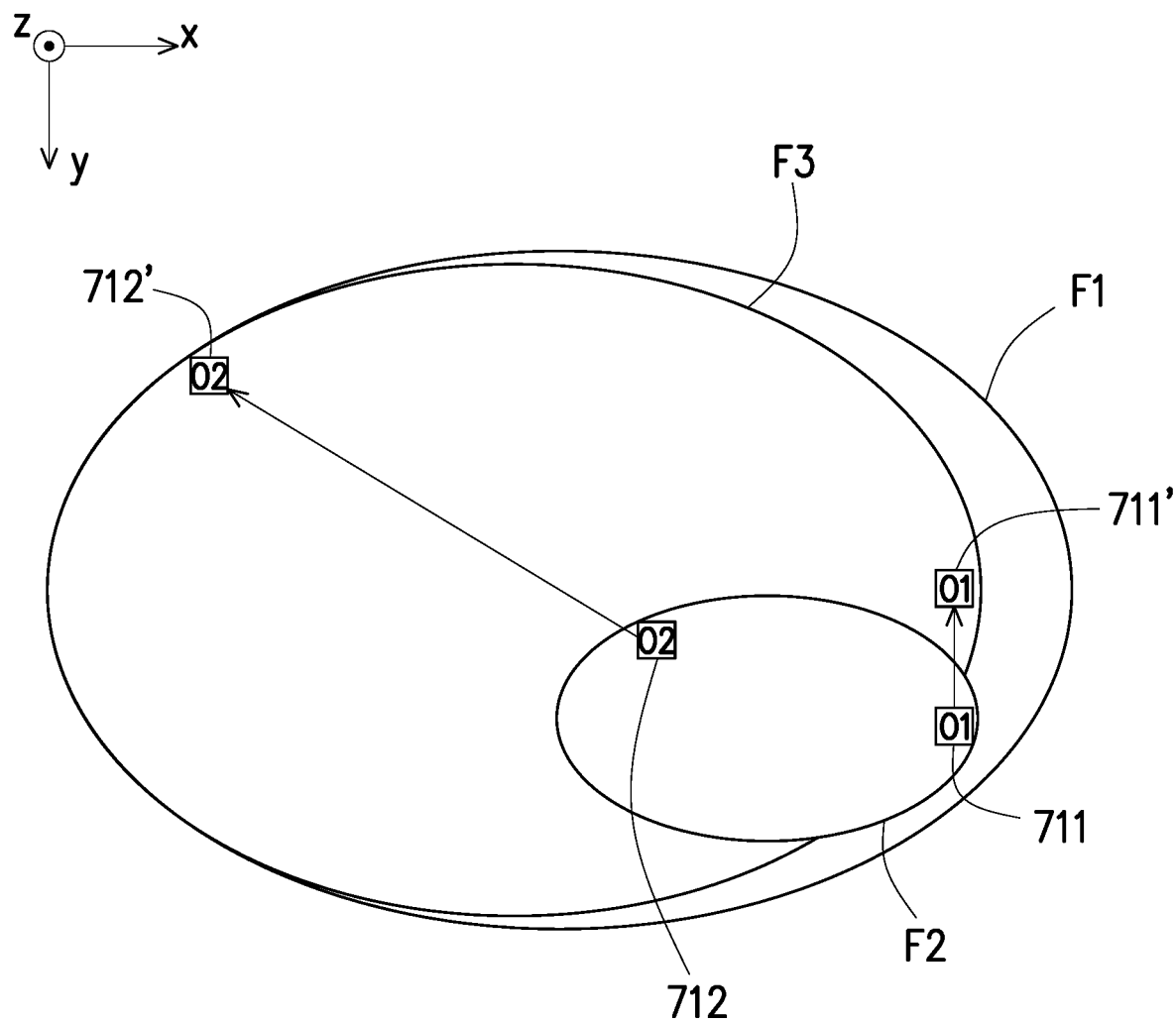
FIG. 7 shows a front view of the first FOV, the second FOV, and the sub-FOV according to an embodiment of the disclosure.

See FIG. 7, which shows a front view of the first FOV, the second FOV, and the sub-FOV according to an embodiment of the disclosure. In FIG. 7, the first FOV F1 may include a sub-FOV F3, wherein the sub-FOV F3 can be designed as a particular area within the first FOV F1 for some specific applications.

In the embodiment, the size of the sub-FOV F3 can be between the first FOV F1 and the second FOV F2. As mentioned in the above, the sub-FOV F3 can be characterized by the third viewing angle AN3. In this case, the processor 204 can obtain the FOV ratio via dividing the third viewing angle AN3 by the second viewing angle AN2, i.e., the processor 204 obtains the FOV ratio by calculating AN3/AN2, but the disclosure is not limited thereto.

With the FOV ratio (i.e., AN3/AN2), the processor 204 can accordingly perform steps S340-S360 based on the above teachings, and the details can be referred to the descriptions in the above embodiments, which would not be repeated herein.

Similar to the teachings of FIG. 5A and FIG. 5B, all the positions in the second FOV F2 can be mapped to the corresponding positions in the sub-FOV F3.

Therefore, for the virtual objects O1-O2, instead of showing the virtual objects O1-O3 at the corresponding to-be-projected positions 711-712, the processor 204 would show the virtual objects O1-O2 at the corresponding second positions 711'-712', i.e., the mapped positions of the to-be-projected positions 711-712 in the sub-FOV F3.

The disclosure further provides a computer readable storage medium for executing the method for adjusting a virtual object. The computer readable storage medium is composed of a plurality of program instructions (for example, a setting program instruction and a deployment program instruction) embodied therein. These program instructions can be loaded into the host 200 and executed by the same to execute the method for adjusting a virtual object and the functions of the host 200 described above.

In summary, the embodiments of the disclosure provide a mechanism for adjusting the shown position of the virtual object based on the size relationship between the first FOV of the virtual world and the second FOV of the camera. Accordingly, the visual experience of the user can be prevented from being affected by the suddenly disappeared virtual objects even if the corresponding physical objects are in the dead zone of the camera. In addition, when tracking the physical object (e.g., the handheld controllers of the VR system), the host does not need to rely on the motion data provided by the auxiliary devices on the physical object.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for adjusting a virtual object, adapted to a host, comprising:
   obtaining a first field of view (FOV) of a virtual world;
   obtaining a second FOV of a camera, wherein a first physical object locates within the second FOV of the camera;
   determining a FOV ratio based on the first FOV and the second FOV;
   determining a first position of a first virtual object in the virtual world relative to a reference object in the virtual world, wherein the first virtual object corresponds to the first physical object;
   determining a second position of the first virtual object in the virtual world based on the first position and the FOV ratio via multiplying the FOV ratio by the first position, wherein the first position comprises a distance between the first virtual object and at least one reference plane or a multi-axis angle of the first virtual object relative to a user representative object; and
   showing the first virtual object at the second position in the virtual world.

2. The method according to claim 1, wherein the first FOV and the second FOV are characterized by a first viewing angle and a second viewing angle, and the step of determining the FOV ratio based on the first FOV and the second FOV comprises:
   obtaining the FOV ratio via dividing the first viewing angle by the second viewing angle.

3. The method according to claim 1, wherein the first FOV comprises a sub-FOV, the first FOV and the sub-FOV are characterized by a first viewing angle and a third viewing angle and the step of determining the FOV ratio based on the first FOV and the second FOV comprises:
   obtaining the FOV ratio via dividing the third FOV by the second FOV.

4. The method according to claim 1, wherein the reference object comprises the at least one reference plane in the virtual world, and the step of determining the first position of the first virtual object in the virtual world relative to the reference object in the virtual world comprises:
   obtaining the distance between the first virtual object and each of the at least one reference plane as the first position of the first virtual object in the virtual world relative to the reference object in the virtual world.

5. The method according to claim 4, wherein the at least one virtual plane comprises at least one of a Y-Z plane, an X-Z plane, and an X-Y plane in the virtual world, and the method comprises:
   in response to determining that the reference object is the Y-Z plane, obtaining an X component of a coordinate of the first virtual object in the virtual world as the distance between the first virtual object and the Y-Z plane;
   in response to determining that the reference object is the X-Z plane, obtaining a Y component of the coordinate of the first virtual object in the virtual world as the distance between the first virtual object and the X-Z plane; and
   in response to determining that the reference object is the X-Y plane, obtaining a Z component of the coordinate of the first virtual object in the virtual world as the distance between the first virtual object and the X-Y plane.

6. The method according to claim 4, wherein before the step of showing the first virtual object at the second position in the virtual world, the method further comprises:
   correcting a depth of the second position.

7. The method according to claim 1, wherein the reference object comprises the user representative object in the virtual world, and the step of determining the first position of the first virtual object in the virtual world relative to the reference object in the virtual world comprises:
   obtaining the multi-axis angle of the first virtual object relative to the user representative object as the first position of the first virtual object in the virtual world relative to the reference object.

8. The method according to claim 1, wherein the first FOV of the virtual world is larger than the second FOV of the camera.

9. A host, comprising:
   a non-transitory storage circuit, storing a program code;
   a processor, coupled to the non-transitory storage circuit and accessing the program code to perform:
   obtaining a first field of view (FOV) of a virtual world;
   obtaining a second FOV of a camera, wherein a first physical object locates within the second FOV of the camera;
   determining a FOV ratio based on the first FOV and the second FOV;
   determining a first position of a first virtual object in the virtual world relative to a reference object in the virtual world, wherein the first virtual object corresponds to the first physical object;
   determining a second position of the first virtual object in the virtual world based on the first position and the FOV ratio via multiplying the FOV ratio by the first position, wherein the first position comprises a distance between the first virtual object and at least one reference plane or a multi-axis angle of the first virtual object relative to a user representative object; and
   showing the first virtual object at the second position in the virtual world.

10. The host according to claim 9, wherein the first FOV and the second FOV are characterized by a first viewing angle and a second viewing angle, and the processor performs:
    obtaining the FOV ratio via dividing the first FOV by the second FOV.

11. The host according to claim 9, wherein the first FOV comprises a sub-FOV, the first FOV and the sub-FOV are characterized by a first viewing angle and a third viewing angle and the processor performs:
    obtaining the FOV ratio via dividing the first viewing angle by the second viewing angle.

12. The host according to claim 9, wherein the reference object comprises the at least one reference plane in the virtual world, and the processor performs:
    obtaining the distance between the first virtual object and each of the at least one reference plane as the first position of the first virtual object in the virtual world relative to the reference object in the virtual world.

13. The host according to claim 12, wherein the at least one virtual plane comprises at least one of a Y-Z plane, an X-Z plane, and an X-Y plane in the virtual world, and the processor performs:
- in response to determining that the reference object is the Y-Z plane, obtaining an X component of a coordinate of the first virtual object in the virtual world as the distance between the first virtual object and the Y-Z plane;
- in response to determining that the reference object is the X-Z plane, obtaining a Y component of the coordinate of the first virtual object in the virtual world as the distance between the first virtual object and the X-Z plane; and
- in response to determining that the reference object is the X-Y plane, obtaining a Z component of the coordinate of the first virtual object in the virtual world as the distance between the first virtual object and the X-Y plane.

14. The host according to claim 12, wherein before showing the first virtual object at the second position in the virtual world, the processor further performs:
- correcting a depth of the second position.

15. The host according to claim 9, wherein the reference object comprises the user representative object in the virtual world, and the processor performs:
- obtaining the multi-axis angle of the first virtual object relative to the user representative object as the first position of the first virtual object in the virtual world relative to the reference object.

16. A non-transitory computer readable medium, the computer readable storage medium recording an executable computer program, the executable computer program being loaded by a host to perform steps of:
- obtaining a first field of view (FOV) of a virtual world;
- obtaining a second FOV of a camera, wherein a first physical object locates within the second FOV of the camera;
- determining a FOV ratio based on the first FOV and the second FOV;
- determining a first position of a first virtual object in the virtual world relative to a reference object in the virtual world, wherein the first virtual object corresponds to the first physical object;
- determining a second position of the first virtual object in the virtual world based on the first position and the FOV ratio via multiplying the FOV ratio by the first position, wherein the first position comprises a distance between the first virtual object and at least one reference plane or a multi-axis angle of the first virtual object relative to a user representative object; and
- showing the first virtual object at the second position in the virtual world.

* * * * *